United States Patent [19]

Lauzier

[11] 4,013,144
[45] Mar. 22, 1977

[54] CALIPER BRAKE FOR CYCLES AND THE LIKE

[75] Inventor: René Lauzier, Ruy, France

[73] Assignee: Angenieux-CLB S.A., St-Etienne, France

[22] Filed: June 29, 1976

[21] Appl. No.: 700,780

[30] Foreign Application Priority Data

July 11, 1975    France ............................ 75.22632

[52] U.S. Cl. ............................................. 188/24
[51] Int. Cl.² ........................................ B62L 1/10
[58] Field of Search ............. 188/24, 27, 72.9, 344

[56] References Cited

UNITED STATES PATENTS 3,628,635   12/1971   Yoshigai ............................ 188/24

FOREIGN PATENTS OR APPLICATIONS

| 535,319 | 4/1922 | France | 188/24 |
| 932,172 | 3/1948 | France | 188/24 |
| 460,900 | 12/1950 | Italy | 188/24 |
| 443,421 | 2/1936 | United Kingdom | 188/24 |
| 675,533 | 7/1952 | United Kingdom | 188/24 |
| 1,093,809 | 12/1967 | United Kingdom | 188/24 |

Primary Examiner—Trygve M. Blix
Assistant Examiner—Edward R. Kazenske
Attorney, Agent, or Firm—Karl F. Ross; Herbert Dubno

[57] ABSTRACT

A caliper brake for cycles and the like in which a bridge piece secures the caliper brake to the cycle frame and a pair of arms are pivotally mounted and carry brake jaws which press against the cycle wheel when a cable is drawn. According to the invention at least one of the arms and the support are connected by a threaded member and are respectively tapped so as to receive the threaded member as a screw-and-nut connection. A clearance is provided axially to permit the arm to move slightly as it is rotated about the screw member on the latter.

14 Claims, 7 Drawing Figures

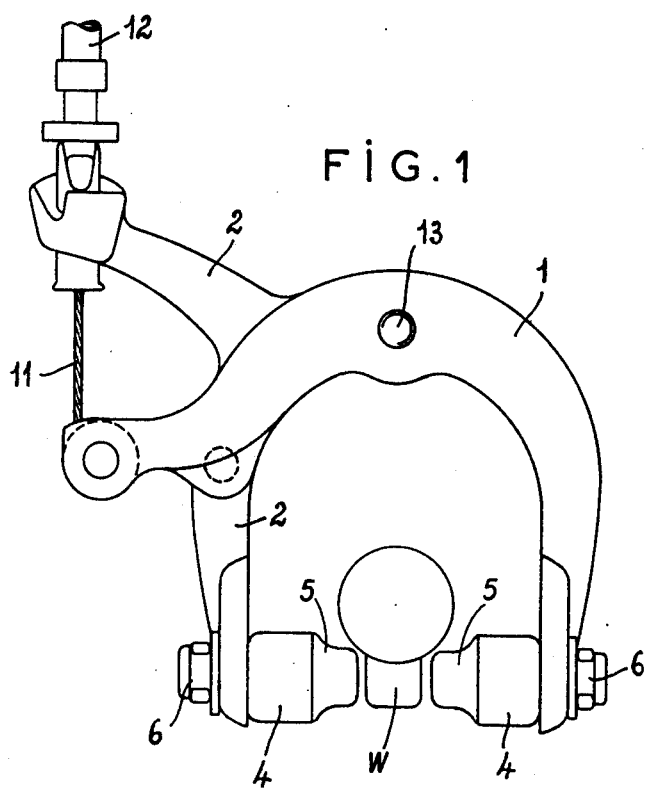
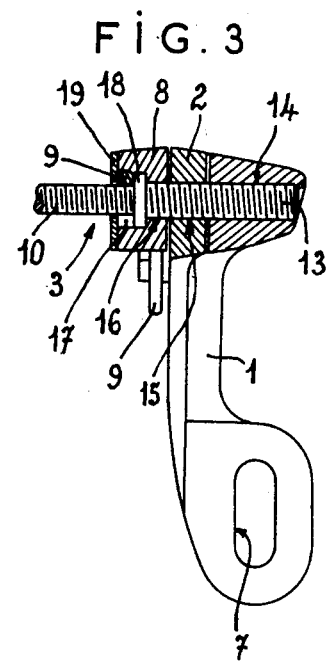
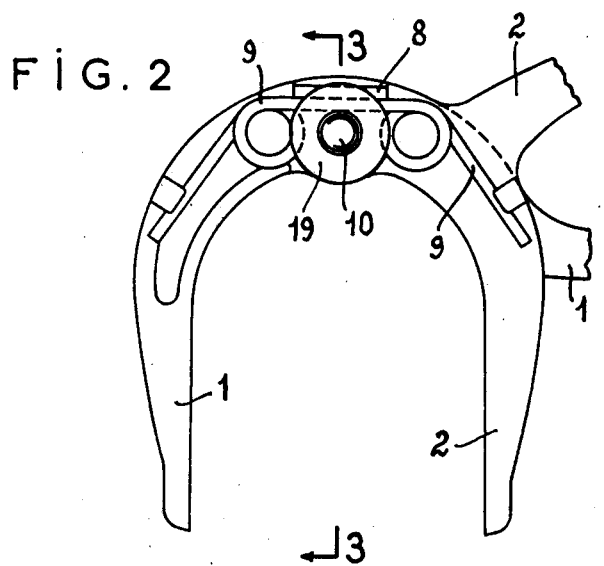

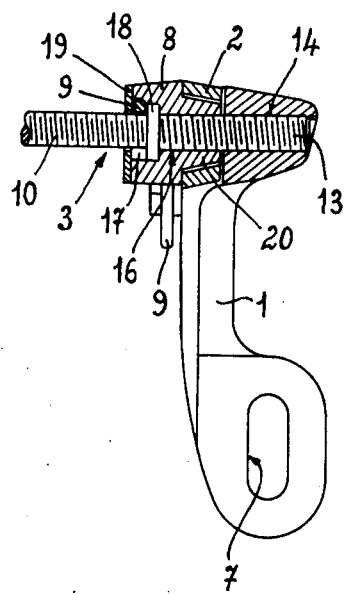
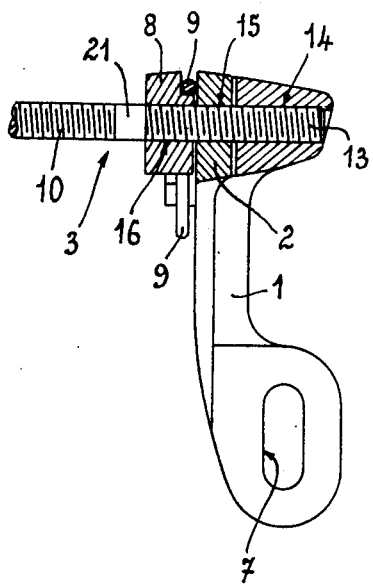
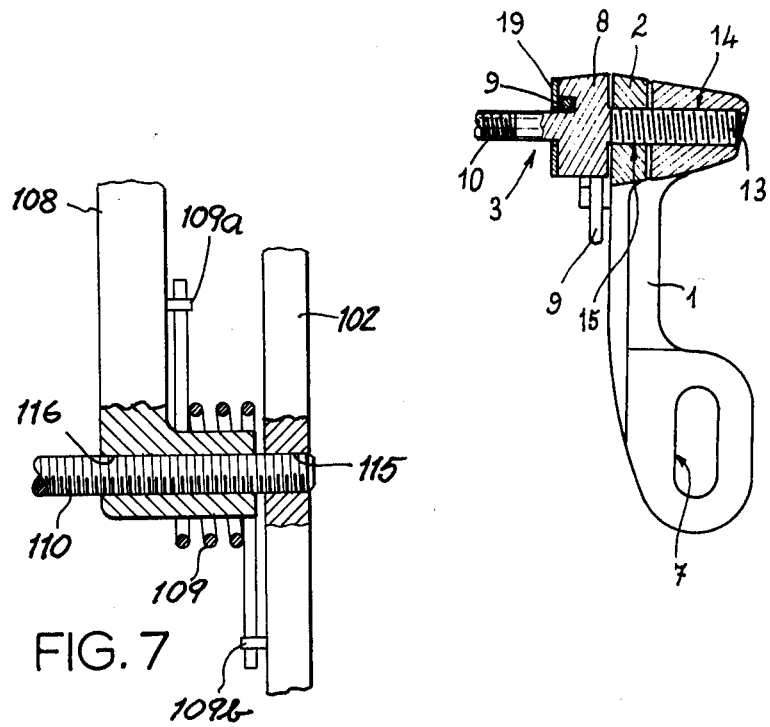

4,013,144

CALIPER BRAKE FOR CYCLES AND THE LIKE

FIELD OF THE INVENTION

The present invention relates to caliper-type brakes for cycles and the like in which each of the two brake jaws is fixed on a brake arm and the arms are pivotally mounted for sweeping movement upon displacement by a cable. More particularly the invention relates to the mounting of the arms of the brake on one or more axes to impart angular displacement to the arms, thereby bringing their jaws against the wheel of the cycle.

BACKGROUND OF THE INVENTION

Bicycle and motorcycle or tricycle brakes are known in which the brake is mounted at the top of the wheel fork and is provided with a cable connected to a lever actuated by the operator on the handlebars of the cycle. Such caliper brakes are generally of one of two types.

For example, there are so-called "lateral-draw" caliper brakes in which a pair of arms are swingable about a common axis and are urged apart by a spring resting against a bridge piece also disposed along this axis. There also have been proposed so-called "central-draw" caliper brakes in which each of the arms is pivotally mounted upon a respective axis carried by an arcuate or stirrup-shaped bridge piece and generally urged outwardly by a respective spring disposed along the respective axis.

In both types of brakes the actuator is a cable which, in the lateral-draw system, has its Bowden sheath acting on one of the arms while the cable core is connected to the other. In the central-draw brake, the cable is connected to both of the arms and the sheath is fixed to the bicycle frame or the bridge piece.

A lateral-draw caliper brake of the type generally described above comprises two arms of different form, namely an arcuate arm and a Y-shaped arm. The two arms are mounted on a common axis disposed in the median plane of the wheel. This axis is fixedly defined by the bridge piece which supports the spring tending to spread the two jaws of the brake. The central-draw brake comprises a pair of symmetrical arms, each of which is pivotal about a respective axis disposed to one side of the median plane of the wheel. The bridge piece, in this embodiment, carries the two axes and enables the brake to be affixed to the top of the fork of the bicycle wheel.

The mounting of the arms on their respective axes is generally carried out with relatively complex means and consequently the mounting assemblies are relatively expensive and heavy. For purposes of illustration, it should be noted that the conventional technique to pivot an arm on a supporting member is to provide the arm with a throughgoing bore of a diameter sufficient to enable it to clear the diameter of a bolt which is locked to the fork of the wheel with a nut-and-counternut arrangement. For example, in the case of a lateral-draw brake, the bridge piece may constitute the bolt and may be extended by a shank which is threaded and passed with clearance through a bore in the pivotal arms. The arms are thus mounted for free rotation on a smooth part of the shaft formed by the bolt. Translatory movement of the arms is prevented by a nut and another nut may be provided as a counternut to lock the assembly in place.

A washer between the arms prevents frictional engagement of their juxtaposed faces during pivotal movement. The assembly must be made with considerable precision to avoid axial movement of the relatively pivotable parts to provide the rigidity required for effective braking action.

In the case of central-draw caliper brakes, a similar bolt, having a smooth portion along its length, serves as the pivot axis for each of the respective arms.

OBJECT OF THE INVENTION

The principal object of the present invention is to provide a simplified mounting for a caliper-type brake which assures rigidity thereof by eliminates various parts and greatly improves the functioning of the brake as a whole.

SUMMARY OF THE INVENTION

This object and others which will become apparent hereinafter are attained, in accordance with the present invention, in a caliper-type brake comprising a bridge member, a pair of arm members, each of which carries a jaw or brakeshoe engageable with a wheel of a cycle, and a threaded shaft which is threaded into at least two of these members and forms a pivot axis for at least one of them. According to the invention, therefore, the pivot axis itself is threaded into the pivotally displaceable member and, to this end, the latter member is formed with an internally threaded bore into which the shaft is threaded, i.e. the internally threaded bore has the same diameter as the externally threaded shaft. The pivotal arm moves on the threaded shaft as a nut-screw connection permitting the rotation of the arm together with a negligible axial displacement thereof. The axial displacement corresponds to the fraction of the pitch of the screw through which the arm is rotated from its ineffective position into its engaged position.

In the case of a lateral-draw brake which is the preferred embodiment of the present invention, the bridge member is also provided with an internally threaded bore of the same diameter as the threaded shaft and into which the threaded shaft is screwed. A shoulder is provided on the threaded shaft against which the bridge member is screwed to bottom or abut.

The lateral-draw caliper-type brake of the present invention can be made in various configurations. For example, the two arms of the brake can be provided with internally threaded bores of the same diameter and can be screwed onto the threaded shaft one after the other. Thus, along this shaft there are disposed in succession the bridge member (threaded onto the shaft), the arcuate arm also threaded onto the shaft, and finally the Y-shaped arm which is likewise threaded onto the shaft.

According to another configuration of the lateral-draw brake, one of the arms is provided with an internally threaded bore which is screwed onto the shaft directly while the other arm is journaled on a boss provided on the first arm and is disposed between this first arm and the bridge member. The second arm is thus free to rotate on this boss of the first arm.

Alternatively, the bridge member may be provided with a boss to carry the second arm which is freely rotatable thereon, while the bridge member is threaded onto the shaft. The first member is here again threaded onto the shaft.

The central-draw brake can have two arms, each of which is provided with an internally threaded bore screwed onto a respective axis shaft which is of the same diameter and can also be threaded into the bridge member.

Thus the invention comprises, in summary, the formation of one or both arms of a caliper-type brake having two arms each of which is swingable to bring a brake shoe into engagement with the wheel, on a pivot axis with a screw-nut-type mounting. In the case of the lateral-draw brake, the threaded shaft can extend beyond the bridge member and pass through a hole in the fork to be tightened thereagainst by a locking nut.

In both embodiments it must be noted that an axial clearance must be left between successive members threaded onto the threaded bolt so as to provide the play necessary for angular displacement of the arms. In either case the angular displacement of the arms is accompanied by an axial or transverse displacement which is accommodated by this play. This axial displacement or play, however, is negligible and does not adversely affect the rigidity of the assembly which, surprisingly, is far greater than that obtained with conventional brake mounting arrangements because the threads provide security against distortion of the arms on braking.

The advantages of the improved mounting system of the invention are numerous:

First, the support of the arms against uncontrolled translation is provided by threads which provide a substantially larger surface area than is available in conventional mounting systems and thus functions to prevent distortion to a far greater extent.

Secondly, anti-fraction washers are eliminated since the play is perfectly controlled by the thread guidance of the movable arms.

Thirdly, the system requires fewer nuts than have hitherto been necessary on conventional caliper-type brakes.

Fourthly, frictional contact between the arms or between an arm and the bridge member is eliminated so that the brake functions more effectively without jamming.

Fifthly, because of the elimination of unnecessary nuts, counternuts, washers and the like, the entire assembly is less costly and more economical to manufacture and can be of lighter weight which is of considerable importance in the case of brakes designed for bicycle-racing competition.

Finally, the esthetics of the brake is improved by elimination of the nut at the front end thereof so that the assembly can have a more aerodynamic configuration.

BRIEF DESCRIPTION OF THE DRAWING

The above and other objects, features and advantages of the present invention will become more readily apparent from the following description, reference being made to the accompanying drawing in which:

FIG. 1 is a front elevational view of a lateral-draw caliper brake according to the invention;

FIG. 2 is a view of the rear thereof, partly broken away;

FIG. 3 is a transverse section taken along the line III — III of FIG. 2;

FIGS. 4 and 5 are sectional views similar to FIG. 3 illustrating two other embodiments of the mounting assembly for a lateral-draw brake according to the invention;

FIG. 6 is another sectional view similar to FIG. 3 showing another variant of the brake; and FIG. 7 is a sectional view through the pivot of a central-draw brake embodying the invention.

SPECIFIC DESCRIPTION

As shown in FIG. 1, the lateral-draw brake of the present invention can comprise, in the usual manner, a pair of arms 1 and 2, respectively the arcuate arm and the Y-shaped arm, pivotally mounted for counterrotation about a common axis, disposed in the median plane of the wheel W. The arm 1, disposed forwardly, is denominated the arcuate arm because of its generally C-shaped configuration. The rearwardly disposed arm 2 possesses a generally fork shape and, for this reason, is denominated a Y-shaped arm. Each of the two arms carries, on its lower portion, a brake shoe 4 provided with a brake lining 5 of rubber or other high-friction material, the brake shoe 4 being held in place by a nut 6. The position of the brake shoe can be adjusted relative to the respective arm by means of a slot 7 formed therein and shown in FIGS. 3 – 6.

The shaft 3 supporting the two arms 1 and 2 is fixed, in the embodiment of FIGS. 1 – 3, to a bridge member 8 by being unitary or integral therewith or, preferably, by providing the bridge member 8 with an internally threaded bore 16 which is threaded onto the externally threaded portion 13 of the shaft 3. The bridge member 8 engages the central portion of a spring 9 which acts upon the arms 1 and 2 tending to separate their brake shoes 4.

The rear portion of the shaft 3 is threaded, as shown to enable the brake assembly to be mounted in the head of the wheel fork (not shown) by passing it through a bore therein and locking it in place with a nut. The actuating system comprises a cable 11 mounted in a sheath 12, the cable engaging one extremity of the arcuate arm 1 while the sheath 12 abuts an extremity of the Y-shaped arm 2. The cable 11 can be drawn upwardly relative to the sheath 12 by a brake-actuating lever on the handlebars of the bicycle.

According to the invention, the forwardly threaded portion 13 of the shaft 3 is screwed into the bridge member 8 and one, at least, of the two arms 1 and 2. Thus, in the embodiment of FIG. 3, each of the arms 1 and 2 is provided with an internally threaded bore, respectively shown at 14 and 15, of the same diameter as threaded portion of member 3. The bridge member 8 is screwed tightly against (to bottom upon) a shoulder 18 formed on the shaft 3 and received in a recess 17 formed axially in the bridge member 8. The recess 17 can also receive the spring 9 which is retained in place by a washer 19 surrounding the shaft 3 rearwardly of bridge member 8 and held against the head of the fork.

The two internally threaded arms 1 and 2 are also screwed onto the threaded portion 13 of the shaft 3 leaving a slight axial play between them and between the arm 2 and the bridge member 8 as shown in FIG. 3. This arrangement allows each of the arms to rotate upon the shaft 3 in opposite senses to clamp the brake shoes 4 against the wheel. No other nuts or washers are required.

FIG. 4 shows a modification of the system of FIGS. 1 – 3 in which only the arcuate arm 1 is provided with an internally threaded bore 14 and is screwed onto the threaded portion 13 of shaft 3. In this embodiment, the bridge piece 8, which is also screwed onto the threaded portion 13 of the shaft, is formed with a frustoconical boss 20 on which the arm 2 is freely rotatable. The system of FIG. 4 of course operates identically to that of FIGS. 1 – 3.

The embodiment of FIG. 5 differs from the system described in connection with FIGS. 1 – 3 in that the bridge member 8 is not provided with a recess and is threaded onto the threaded portion 13 of the shaft 3 until it bottoms against a smooth or unthreaded portion 21 thereof. The spring 9 can here be received between a notch in the bridge piece 8 and the arm 2 which is threaded at 15 onto shaft 3. The forward arm 1 is formed with a threaded bore 14 also receiving the threaded portion 13 of the shaft 3. The advantage of the system of FIG. 5 over that of FIGS. 1 – 3 is the elimination of the washer 19 and the shoulder 18.

A third variant of the system of FIGS. 1 – 3 has been illustrated in FIG. 6 in which the bridge piece 8 is formed unitarily, i.e. integrally and in one piece, with the shaft 3 and has the threaded portion 10 on its rear side and the threaded portion 13 on its forward side.

A recess in the rear face of the member 8 receives the spring 9 and the washer 19 again holds it in place. Arms 1 and 2 are both threaded onto the portion 13 of the shaft 3.

While the system of FIG. 6 has certain advantages of simplification over that of FIGS. 1 – 5, there is the disadvantage that orientation of the spring-receiving recess of member 8 must be formed with precision with respect to the thread on member 13 if the spring 9 is to be properly oriented. Thus it is advantageous to apply the arms 1 and 2 and then form the recess for the spring 9 to ensure that the latter will occupy its correct position with respect to the arms.

The embodiment of FIG. 7 represents one of the pivot axes of the central-draw brake. The latter has a C-shaped bridge piece 108, only one end of which has been shown, which is secured centrally to the fork of the bicycle. Each end of this bridge piece is provided with a boss having an internal thread 116 and around which a torsion spring 109 is disposed. A threaded shaft 110 can be screwed into the threaded bores 116 and into a threaded bore 115 of one of the caliper arms 102, the arm 102 and the bridge piece 108 being provided with abutments 109b and 109a, respectively, against which the spring 109 bears. A corresponding pivot may be provided on the opposite side of the caliper and a small axial plate is provided between the arm 102 and the boss of the bridge piece 108.

The brake has been found to be effective for bicycles as well as for motorcycles and like vehicles.

I claim:

1. A caliper brake for cycles and the like, comprising:
a bridge member adapted to be mounted upon a cycle;
a pair of arm members pivotally mounted about at least one axis fixed relative to said bridge member for swinging movement in opposite senses;
cable actuating means connected to said arm members for swinging same in said opposite senses;
respective brake shoes on said arm members displaceable against a wheel upon swinging movement of said arm members in said opposite senses; and
a shaft being coincident with said at leaast one axis and being secured to said bridge member said shaft having a threaded portion, one of said arm members being formed with an internally threaded bore of the same diameter as said threaded portion and screwed onto the latter with axial clearance from another of said members permitting rotation of said one of said arm members about said shaft with slight axial displacement of said one of said arm members.

2. The caliper brake defined in claim 1 wherein said arm members are pivotal about a common axis, said brake further comprising a spring bearing on said arm members to urge said brake shoes away from said wheel, said spring being engaged by said bridge member.

3. The caliper brake defined in claim 2 wherein said bridge member is formed with an internally threaded bore of the same diameter as said threaded portion of said shaft and screwed onto the latter.

4. The caliper brake defined in claim 3 wherein both of said arm members are provided with respective threaded bores of the same diameter as said threaded portion and are screwed onto the latter.

5. The caliper brake defined in claim 3 wherein said bridge member is formed with a boss extending in the direction of said one of said arm members, the other of said arm members being rotatably mounted on said boss.

6. The caliper brake defined in claim 5 wherein said boss has a frustoconical configuration and said other of said arm members has a nonthreaded bore of frustoconical configuration complementary to that of said boss.

7. The caliper brake defined in claim 3 wherein said shaft is formed with a shoulder, said bridge member being threaded onto said portion of said shaft to bottom against said shoulder.

8. The caliper brake defined in claim 7 wherein said bridge member is formed with a recess receiving said shoulder.

9. The caliper brake defined in claim 3 wherein said shaft is formed with a nonthreaded portion adjacent said threaded portion, said bridge member being threaded onto said threaded portion until it is blocked by said nonthreaded portion.

10. The caliper brake defined in claim 2 wherein said bridge member is a single piece with said shaft.

11. The caliper brake defined in claim 1 wherein said bridge member is provided with a second shaft, each shaft forming a respective axis for a respective arm member.

12. The caliper brake defined in claim 1 wherein the other of said arm members and said bridge member are also threaded onto said shaft.

13. The caliper brake defined in claim 1 wherein one of the other of said arm members and said bridge member is formed with a boss, and the other of the other of said arm members and said bridge member is provided with a nonthreaded bore receiving said boss and is freely rotatable thereon.

14. The caliper brake defined in claim 1 wherein said bridge member is formed integrally with said shaft and the other of said arm members is also threaded onto said shaft.

* * * * *